United States Patent
Uchida

(10) Patent No.: US 6,618,596 B1
(45) Date of Patent: Sep. 9, 2003

(54) COMMUNICATION SYSTEM, APPARATUS, METHOD, AND RECORDING MEDIUM FOR MOBILE COMMUNICATION

(75) Inventor: Wataru Uchida, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/344,080

(22) Filed: Jun. 25, 1999

(30) Foreign Application Priority Data

Jun. 29, 1998 (JP) .......................................... 10-196499

(51) Int. Cl.7 ................................................ H04B 7/00
(52) U.S. Cl. ..................... 455/522; 455/12.1; 455/13.4; 455/427; 455/345
(58) Field of Search ............................ 455/12.1, 13.1, 455/13.4, 427, 522, 67.3, 345; 370/252, 468

(56) References Cited

U.S. PATENT DOCUMENTS

| | | | |
|---|---|---|---|
| 5,265,119 A | * 11/1993 | Gilhousen et al. | 455/522 |
| 5,455,823 A | * 10/1995 | Noreen et al. | 455/12.1 |
| 5,940,753 A | * 8/1999 | Mallinckrodt | 455/12.1 |
| 6,044,067 A | * 3/2000 | Suzuki | 370/252 |
| 6,061,549 A | * 5/2000 | Labonte et al. | 455/67.3 |

FOREIGN PATENT DOCUMENTS

| | | | |
|---|---|---|---|
| JP | 4-90664 | 3/1992 | |
| JP | 6-82587 | 11/1994 | |
| JP | 8-65731 | 3/1996 | |
| JP | 8-70273 | 3/1996 | |
| JP | 8-79160 | 3/1996 | |
| JP | 411098574 A | * 4/1999 | ............ H04Q/7/38 |

OTHER PUBLICATIONS

Japanese Office Action issued Feb. 1, 2000 in a related application and English translation of relevant portions.

* cited by examiner

*Primary Examiner*—Quochien Vuong
(74) *Attorney, Agent, or Firm*—Dickstein, Shapiro, Morin & Oshinsky, LLP.

(57) ABSTRACT

A mobile communication system in which communication is performed between a base station and a mobile communication terminal apparatus includes a transmission/reception section, a mobile communication terminal apparatus, and a base station. The mobile communication terminal apparatus has a transmission/reception section for transmitting/receiving data between the base station and the mobile communication terminal apparatus, a measuring section for measuring the moving speed of the mobile communication terminal apparatus, and a data transfer rate designation section for instructing the base station to change the data transfer rate in communication in accordance with the moving speed of the mobile communication terminal apparatus which is measured by the measuring section. The base station controls the data transfer rate to perform communication at the data transfer rate designated by the mobile communication terminal apparatus.

9 Claims, 3 Drawing Sheets

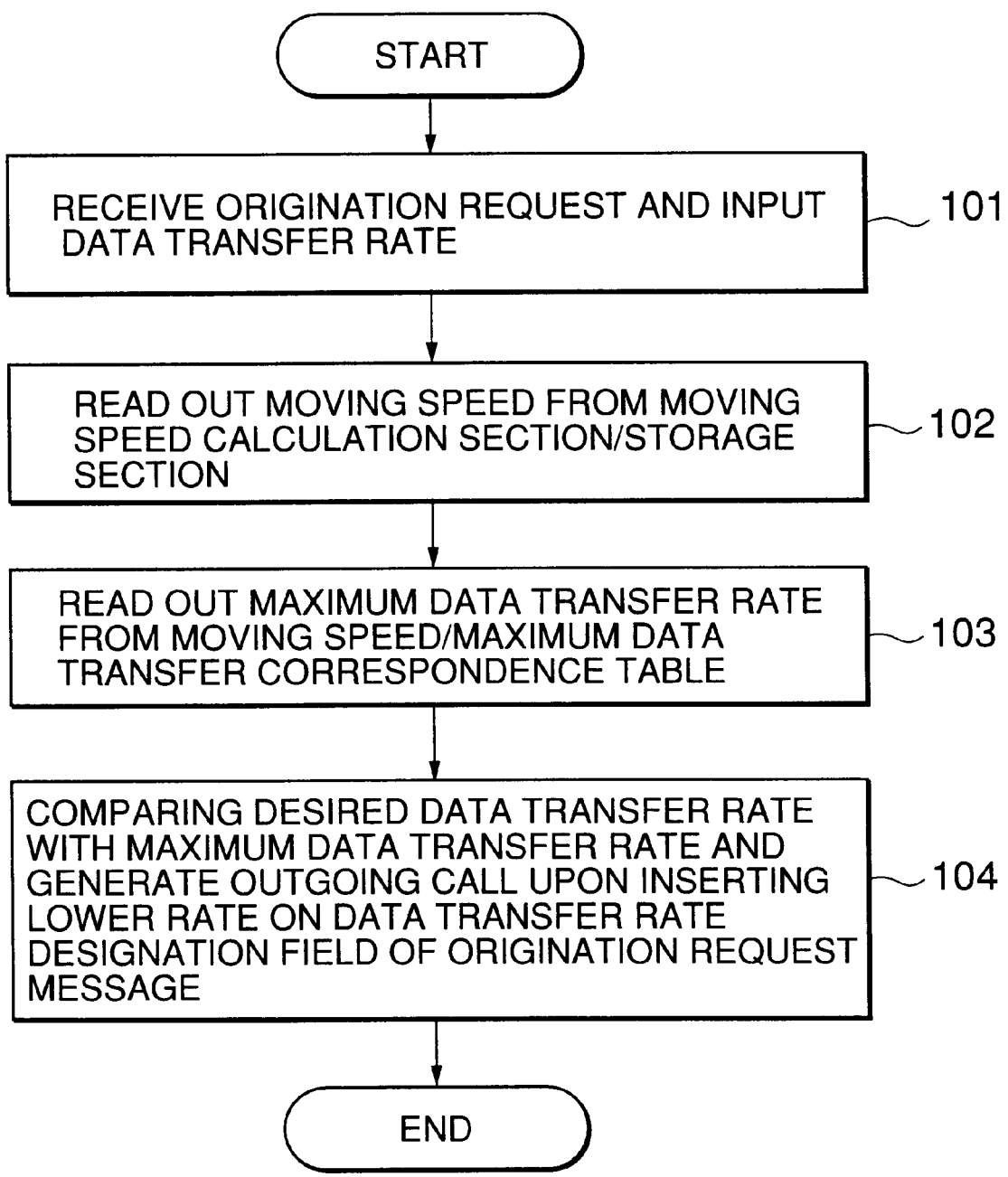

COMMUNICATION SYSTEM, APPARATUS, METHOD, AND RECORDING MEDIUM FOR MOBILE COMMUNICATION

BACKGROUND OF THE INVENTION

1. Field of the Invention

The present invention relates to a communication system, apparatus, method, and recording medium for mobile communication and, more particularly, to a communication system, apparatus, method, and recording medium which can perform stable communication by changing the data transfer rate in accordance with the moving speed of mobile communication terminal apparatus (to be simply referred to as a mobile terminal hereinafter).

2. Description of the Prior Art

As a next-generation mobile communication system, a high-speed, large-capacity system called the IMT-2000 has recently been studied. This system is claimed to realize a maximum data transfer rate of 2 Mbps, which is incomparably higher than those of existing mobile communication systems.

However, data cannot be unconditionally transferred at 2 Mbps, and some limitation is imposed on the maximum data transfer rate in accordance with the moving speed of a mobile terminal. This is because, as the moving speed of the mobile terminal increases, the number of times of handoffs (the function of guaranteeing the continuity of communication across the zone or cell covered by one base station) increases, and a larger impact is exerted on the system. More specifically, it is expected that the maximum data transfer rate becomes 2 Mbps at a low moving speed; 384 Kbps at an intermediate moving speed; and 64 Kbps at a high moving speed.

In conventional mobile communication, however, even if a mobile terminal is moving at a high speed, a data transfer rate exceeding the maximum data transfer rate corresponding to the moving speed is required. In an extreme case, it is required to communicate data at a maximum data transfer rate of 2 Mbps. As a consequence, handoffs often occur, and a larger impact is exerted on the system. The reason why such a reckless attempt is made is that the system does not have an arrangement for measuring the moving speed of a mobile terminal and performing control to communicate data at a maximum data transfer rate corresponding to the moving speed.

SUMMARY OF THE INVENTION

The present invention has been made in consideration of the above situation in the prior art, and has as its object to provide a communication system, apparatus, method, and recording medium for mobile communication, which can perform stable communication regardless of the number of times of handoffs by changing the data transfer rate in accordance with the moving speed of a mobile terminal.

In order to achieve the above object, according to the first aspect of the present invention, there is provided a mobile communication system in which communication is performed between a base station and a mobile communication terminal apparatus, comprising a mobile communication terminal apparatus having a transmission/reception section for transmitting/receiving data between the base station and the mobile communication terminal apparatus, a measuring section for measuring a moving speed of the mobile communication terminal apparatus, and a data transfer rate designation section for instructing the base station to change a data transfer rate in communication in accordance with a moving speed of the mobile communication terminal apparatus which is measured by the measuring section, and a base station for controlling the data transfer rate to perform communication at the data transfer rate designated by the mobile communication terminal apparatus.

In order to achieve the above object, according to the second aspect of the present invention, there is provided a mobile communication apparatus for a mobile communication terminal apparatus for performing communication through a base station, comprising a transmission/reception section for transmitting/receiving data between the base station and the mobile communication terminal apparatus, a measuring section for measuring a moving speed of the mobile communication terminal apparatus, and a data transfer rate designation section for instructing the base station to change a data transfer rate in communication in accordance with a moving speed of the mobile communication terminal apparatus which is measured by the measuring section, wherein communication with the base station is performed at a data transfer rate permitted in accordance with the moving speed of the mobile communication terminal apparatus.

The communication apparatus according to the second aspect further comprises a satellite reception section for receiving electric waves from a plurality of measurement satellites, and the measuring section calculates a current position of the mobile communication terminal apparatus at predetermined time intervals from the electric waves received by the satellite reception section, and measures the moving speed of the mobile communication terminal apparatus on the basis of changes in calculated current position over time.

In addition, the communication apparatus according to the second aspect further comprises a storage section storing a table in which the moving speed of the mobile communication terminal apparatus which is measured by the measuring section is stored in correspondence with a maximum data transfer rate permitted in accordance with the moving speed, reads out a permitted maximum data transfer rate corresponding to the moving speed measured by the measuring section from the storage section, and instructs the base station through the data transfer rate designation section to perform communication at the permitted maximum data transfer rate.

Furthermore, the communication apparatus according to the second aspect further comprises an input section for inputting a data transfer rate, and instructs the base station through the data transfer rate designation section to make a change to the data transfer rate input by the input section when the data transfer rate input by the input section is lower than a permitted maximum data transfer rate corresponding to the moving speed measured by the measuring section.

In order to achieve the above object, according to the third aspect of the present invention, there is provided a communication method of performing communication between a base station and a mobile communication terminal apparatus, comprising the transmission/reception step of transmitting/receiving data between the base station and the mobile communication terminal apparatus, the measuring step of measuring a moving speed of the mobile communication terminal apparatus, the data transfer rate designation step of instructing the base station to change a data transfer rate in communication in accordance with the moving speed of the mobile communication terminal apparatus which is measured in the measuring step, and the communication step of performing communication at a data transfer rate permitted in accordance with the moving speed of the mobile communication terminal apparatus.

In order to achieve the above object, according to the fourth aspect of the present invention, there is provided a recording medium on which a program for executing the communication method according to the third aspect is recorded.

As is obvious from the above aspects, in the communication system, apparatus, method, and recording medium for mobile communication of the present invention, when data is to be transmitted/received between a mobile terminal and a base station, the moving speed of the mobile terminal is measured, and a command is output to the base station to change the data transfer rate in communication in accordance with the measured moving speed, thereby performing communication with the base station at a data transfer rate permitted in accordance with the moving speed of the mobile terminal. This allows stable communication without increasing the impact on the system even with an increase in the number of times of handoffs.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 4 is a flow chart for explaining the operation of the mobile communication terminal apparatus.

DETAILED DESCRIPTION OF PREFERRED EMBODIMENT

A preferred embodiment of the present invention will be described below with reference to the accompanying drawings.

Figure 1:
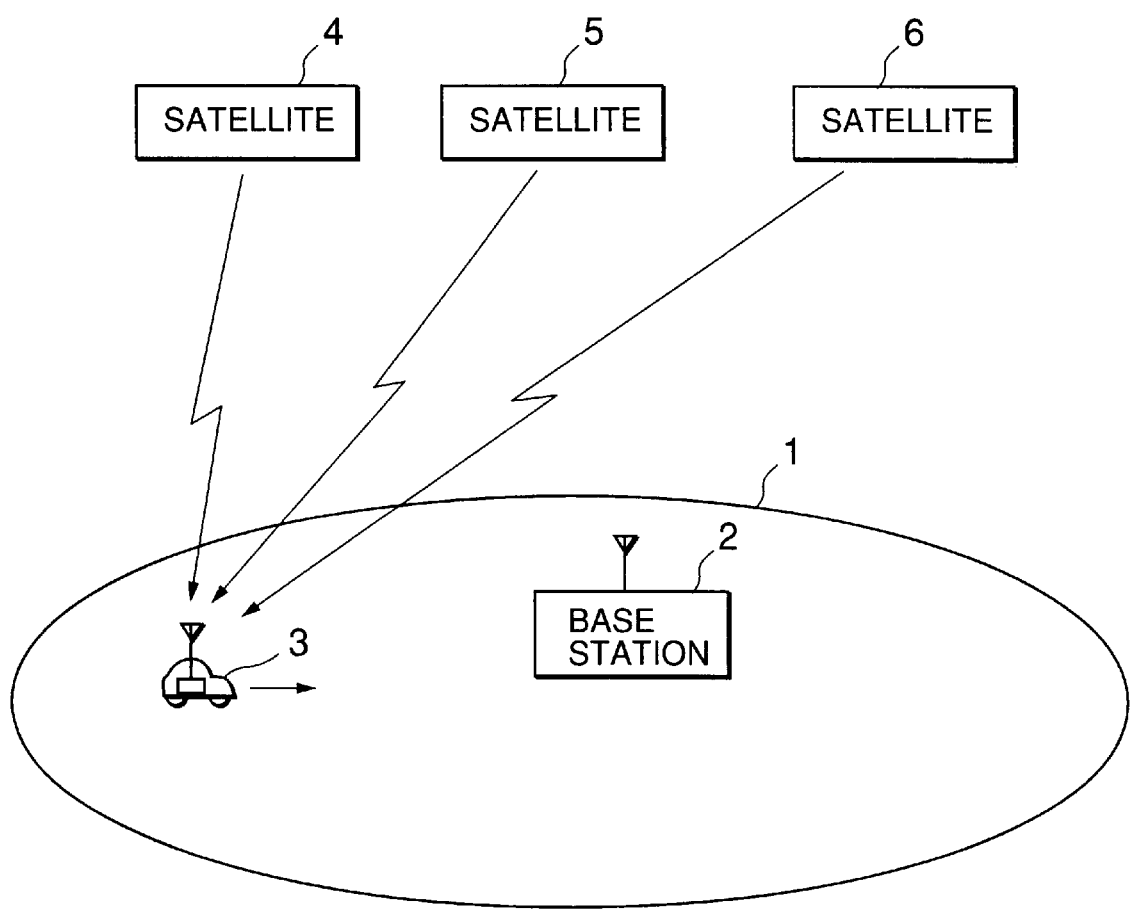
FIG. 1 is a schematic view for explaining the overall arrangement of a mobile communication system according to an embodiment of the present invention.

FIG. 1 is a block diagram showing the arrangement of a mobile communication system according to an embodiment of the present invention. As shown in FIG. 1, a base station 2 serves a service zone 1, and a mobile terminal 3 is moving in the service zone 1. The mobile terminal 3 receives electric waves transmitted from satellites for measurement (measurement satellites) 4, 5, and 6 and measures the current position from the phase differences between the received electric waves. When the mobile terminal 3 moves to another service zone, handoff operation is performed to switch communication with the base station 2 in the service zone 1 to communication with a base station in another service zone.

Figure 2:
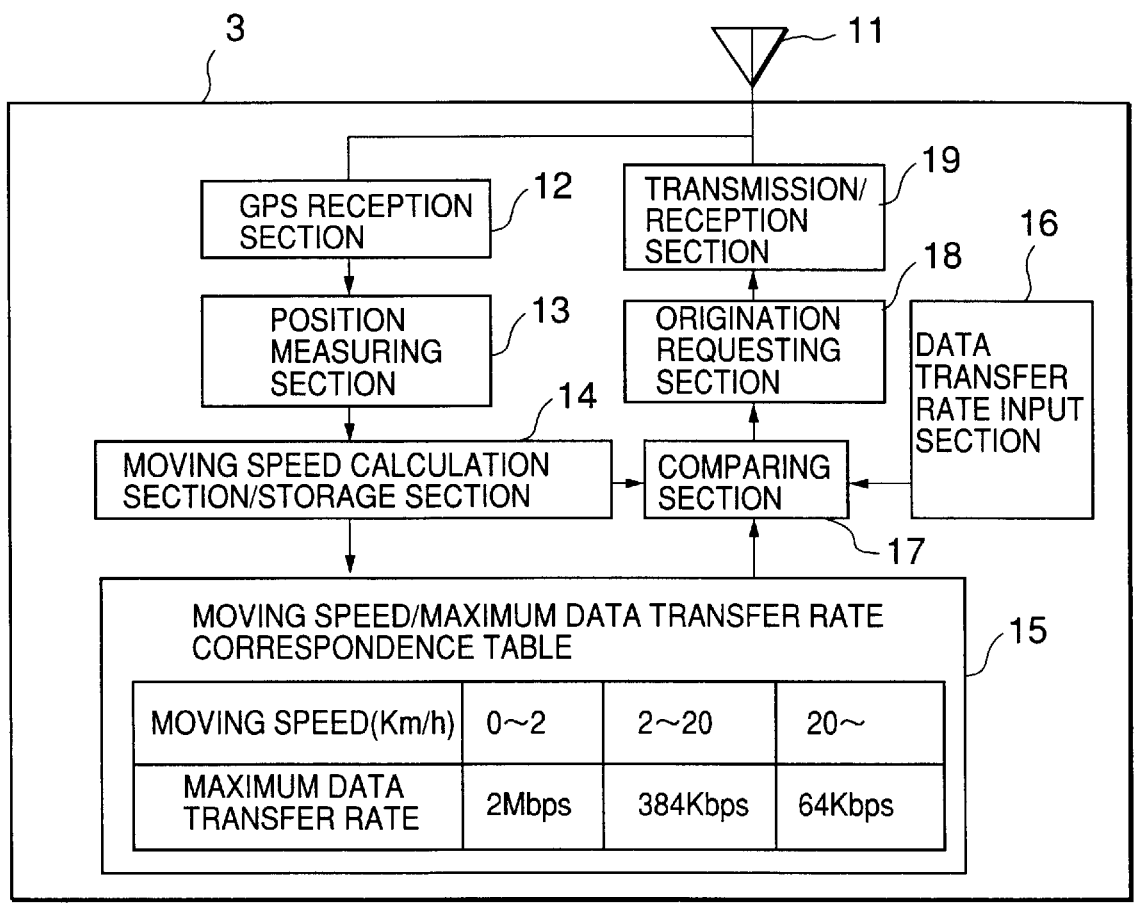
FIG. 2 is a block diagram showing the inner arrangement of a mobile communication terminal apparatus used in the present invention.

FIG. 2 is a block diagram showing a detailed example of the arrangement of the mobile terminal 3 in FIG. 1. As shown in FIG. 1, the mobile terminal 3 includes a GPS (Global Positioning System) reception section 12 for receiving electric waves transmitted from the measurement satellites 4, 5, and 6 through an antenna 11, a position measuring section 13 for measuring the current position of the mobile terminal 3 at predetermined time intervals on the basis of the received electric waves, and a moving speed calculation section/storage section 14 for calculating the moving speed of the mobile terminal 3 according to changes in the position calculated by the position measuring section 13 over time and storing the calculated moving speed.

Figure 3:
FIG. 3 is a view showing an example of the signal format of an origination request message.

The mobile terminal 3 includes a data transfer rate input section 16 for inputting a desired data transfer rate when data is to be transmitted, a comparing section 17 for reading out the current moving speed of the mobile terminal 3 from the moving speed calculation section/storage section 14, reading out the maximum data rate which corresponds to the current moving speed of the mobile terminal 3 and is permitted by the mobile communication system in an air interval (interval between the mobile terminal and the base station) from a moving speed/maximum data rate correspondence table 15, comparing the readout maximum data transfer rate with the desired data transfer rate input by the data transfer rate input section 16, and outputting the lower data rate, an origination requesting section 18 for generating an origination request by wrapping the transfer data rate output from the comparing section 17 in the data transfer rate command field of an origination request message in the signal format shown in FIG. 3, and a transmission/reception section 19 for transmitting the origination request message from the origination requesting section 18 through the antenna 11. In addition, the transmission/reception section 19 is designed to perform general speech communication and data communication.

The operation of the mobile terminal 3 will be described next. Electric waves transmitted from the measurement satellites 4, 5, and 6 are received by the GPS reception section 12 through the antenna 11 and supplied to the position measuring section 13. The position measuring section 13 calculates the phase differences between the respective electric waves transmitted from the measurement satellites 4, 5, and 6, and measures the current position of the mobile terminal 3 on the basis of the phase differences. The measured current position is expressed in the form of a latitude and longitude.

This latitude/longitude information is supplied to the moving speed calculation section/storage section 14. The moving speed calculation section/storage section 14 calculates the moving speed of the mobile terminal 3 by periodically observing the latitude/longitude information, and stores the information in a predetermined memory. The moving speed calculation section/storage section 14 is connected to the moving speed/maximum data rate correspondence table 15 and supplies information representing the moving speed of the mobile terminal 3 to the moving speed/maximum data rate correspondence table 15, as needed, as will be described later. A correspondence table of the moving speed of the mobile terminal 3 and the maximum data transfer rate permitted in the mobile communication system is stored in the moving speed/maximum data rate correspondence table 15.

When the user of the mobile terminal 3 is to transmit data, the user inputs a desired data transfer rate through the data transfer rate input section 16 in accordance with the data amount. The input desired data transfer rate is supplied to the comparing section 17. Upon reception of the desired data transfer rate from the data transfer rate input section 16, the comparing section 17 reads out the current moving speed of the mobile terminal 3 from the moving speed calculation section/storage section 14, and also reads out the maximum data transfer rate which corresponds to the readout current moving speed and is permitted by the mobile communication system from the moving speed/maximum data rate correspondence table 15.

The comparing section 17 compares the desired data transfer rate input by the user and supplied from the data transfer rate input section 16 with the maximum data transfer rate corresponding to the current moving speed of the mobile terminal 3, selects a lower one of the desired data transfer rate and maximum data transfer rate, and supplies the selected data transfer rate to the origination requesting section 18.

The origination requesting section 18 inserts the data transfer rate supplied from the comparing section 17 in the data transfer rate command field of an origination request message in the signal format shown in FIG. 3, and supplies the message to the transmission/reception section 19. The origination request test supplied from the origination requesting section 18 to the transmission/reception section 19 is transmitted from the transmission/reception section 19 to the base station 2 through the antenna 11.

The base station 2 receives the origination request message supplied from the mobile terminal 3, and communicates with the mobile terminal 3 at the data transfer rate written in the data transfer rate designation field.

An origination request sequence will be described next with reference to FIG. 4. A case in which the user operates the mobile terminal 3 to generate an origination request to transmit data will be described first. First of all, the user inputs a desired data transfer rate through the data transfer rate input section 16 in accordance with the amount of data to be sent (step 101). Assume that the user inputs a data transfer rate of 2 Mbps. This desired data transfer rate to the comparing section 17.

The comparing section 17 reads out the current moving speed of the mobile terminal 3 from the moving speed calculation section/storage section 14 (step 102). Assume that the comparing section 17 reads out a speed of 15 Km per hour. Note that this moving speed is calculated by the moving speed calculation section/storage section 14 on the basis of the electric waves transmitted from the measurement satellites 4, 5, and 6.

The comparing section 17 then reads out the maximum data transfer rate which corresponds to the moving speed of the mobile terminal 3 and is permitted by the mobile communication system from the moving speed/maximum data rate correspondence table 15 (step 103). If, for example, the moving speed of the mobile terminal 3 is 15 km per hour, the maximum data transfer rate is 384 Kbps.

The comparing section 17 compares the desired data transfer rate supplied from the data transfer rate input section 16 with the maximum data transfer rate read out from the moving speed/maximum data rate correspondence table 15, and supplies the lower data transfer rate to the origination requesting section 18. The data transfer rate supplied to the origination requesting section 18 is encapsulated in the origination request message frame generated by the origination requesting section 18 and transmitted by the transmission/reception section 19. As a consequence, an outgoing call is sent to the base station 2 (step 104). In this case, 2 Mbps (desired data transfer rate) is compared with 384 Kbps (maximum data transfer rate). Since 384 Kbps is lower, information representing 384 Kbps is encapsulated in the data transfer rate command field of the origination request message frame. With this operation, communication is performed at a data transfer rate of 384 Kbps.

In this embodiment, the above operation prevents the mobile terminal 3 from requesting, from the mobile communication system, a transfer rate exceeding the maximum data transfer rate (stored in the moving speed/maximum data rate correspondence table 15) permitted by the mobile communication system in accordance with the moving speed of the mobile terminal 3. That is, the mobile terminal 3 can request the data transfer rate permitted by the mobile communication system therefrom in accordance with the moving speed of the mobile terminal 3.

This is because the mobile terminal 3 can know its moving speed through the GPS reception section 12, and can also know the maximum data transfer rate permitted by the mobile communication system and corresponding to the moving speed of the mobile terminal 3 through the moving speed/maximum data rate correspondence table 15.

As described above, since the mobile terminal 3 has the GPS reception section 12, the mobile terminal 3 can calculate its moving speed. In addition, since the mobile terminal 3 has the moving speed/maximum data rate correspondence table 15, the mobile terminal 3 can request the maximum data transfer rate permitted in an air zone by the mobile communication system. Even if, therefore, the number of times of handoffs increases, stable communication can be performed.

In the above embodiment, the current position is calculated by using the three measurement satellites. However, four or more measurement satellites can be used.

In the above embodiment, the moving speed of the mobile terminal is measured by receiving electric waves from the measurement satellites. However, the present invention can be applied to a case in which the moving speed of the mobile terminal is measured by another method.

In the above embodiment, the numerical values stored in the moving speed/maximum data rate correspondence table 15 should be considered exemplary only, and are not limited to these.

In addition, in the above embodiment, the origination request sequence has been described. Even, if however, the moving speed of the mobile terminal changes during communication, and the maximum data transfer rate permitted in an air zone by the mobile communication system changes, a command to change the data transfer rate can be transmitted to the base station by the same method as described above.

What is claimed is:

1. A mobile communication system in which communication is performed between a base station and a mobile communication terminal apparatus, comprising:

a mobile communication terminal apparatus having a transmission/reception section for transmitting/receiving data between said base station and said mobile communication terminal apparatus, a measuring section for measuring a moving speed of said mobile communication terminal apparatus, and a data transfer rate designation section for instructing said base station to change a data transfer rate in communication in accordance with a moving speed of said mobile communication terminal apparatus which is measured by said measuring section; and a base station for controlling the data transfer rate to perform communication at the data transfer rate designated by said mobile communication terminal apparatus.

2. A mobile communication apparatus for a mobile communication terminal apparatus for performing communication through a base station, comprising:

a transmission/reception section for transmitting/receiving data between said base station and said mobile communication terminal apparatus;

a measuring section for measuring a moving speed of said mobile communication terminal apparatus; and a data transfer rate designation section for instructing said base station to change a data transfer rate in communication in accordance with a moving speed of said mobile communication terminal apparatus which is measured by said measuring section, wherein communication with said base station is performed at a data transfer rate permitted in accordance with the moving speed of said mobile communication terminal apparatus.

3. An apparatus according to claim 2, wherein said apparatus further comprises a satellite reception section for receiving electric waves from a plurality of measurement satellites, and said measuring section calculates a current position of said mobile communication terminal apparatus at predetermined time intervals from the electric waves received by said satellite reception section, and measures the moving speed of said mobile communication terminal apparatus on the basis of changes in calculated current position over time.

4. An apparatus according to claim 2, wherein said apparatus further comprises a storage section storing a table in which the moving speed of said mobile communication terminal apparatus which is measured by said measuring section is stored in correspondence with a maximum data transfer rate permitted in accordance with the moving speed, reads out a permitted maximum data transfer rate corresponding to the moving speed measured by said measuring section from said storage section, and instructs said base station through said data transfer rate designation section to perform communication at the permitted maximum data transfer rate.

5. An apparatus according to claim 2, wherein said apparatus further comprises an input section for inputting a data transfer rate, and instructs said base station through said data transfer rate designation section to make a change to the data transfer rate input by said input section when the data transfer rate input by said input section is lower than a permitted maximum data transfer rate corresponding to the moving speed measured by said measuring section.

6. An apparatus according to claim 2, wherein said mobile communication terminal apparatus comprises:

a global positioning system reception section for receiving electric waves from measurement satellites;

a position measuring section for measuring a current position of said mobile communication terminal apparatus at predetermined time intervals on the basis of the received satellite electric waves; and a moving speed calculation section/storage section for calculating a moving speed of said mobile communication terminal apparatus from changes in position measured by said position measuring section over time, and storing the moving speed.

7. A communication method of performing communication between a base station and a mobile communication terminal apparatus, comprising:

the transmission/reception step of transmitting/receiving data between said base station and said mobile communication terminal apparatus;

the measuring step of measuring a moving speed of said mobile communication terminal apparatus;

the data transfer rate designation step of instructing said base station to change a data transfer rate in communication in accordance with the moving speed of said mobile communication terminal apparatus which is measured in the measuring step; and the communication step of performing communication at a data transfer rate permitted in accordance with the moving speed of said mobile communication terminal apparatus.

8. A recording medium on which a program for executing a communication method is recorded, the method comprising:

the transmission/reception step of transmitting/receiving data between said base station and said mobile communication terminal apparatus;

the measuring step of measuring a moving speed of said mobile communication terminal apparatus;

the data transfer rate designation step of instructing said base station to change a data transfer rate in communication in accordance with the moving speed of said mobile communication terminal apparatus which is measured in the measuring step; and the communication step of performing communication at a data transfer rate permitted in accordance with the moving speed of said mobile communication terminal apparatus.

9. A mobile communication apparatus for a mobile communication terminal for performing communication through a base station, wherein said mobile communication terminal apparatus comprises;

a transmission/reception section for transmitting/receiving data between said base station and said mobile communication terminal apparatus;

a measuring section for measuring a moving speed of said mobile communication terminal apparatus;

a data transfer rate designation section for instructing said base station to change a data transfer rate in communication in accordance with a moving speed of said mobile communication terminal apparatus which is measured by said measuring section;

wherein communication with said base station is performed at a data transfer rate permitted in accordance with the moving speed of said mobile communication terminal apparatus;

a global positioning system reception section for receiving electric waves from measurement satellites;

a position measuring section for measuring a current position of said mobile communication terminal apparatus at predetermined time intervals on the basis of the received satellite electric waves;

a moving speed calculation section/storage section for calculating a moving speed of said mobile communication terminal apparatus from changes in position calculated by said position measuring section over time;

a data transfer rate input section for inputting a desired data transfer rate;

a moving speed/maximum data transfer rate correspondence table in which the moving speed of said mobile communication terminal apparatus is made to correspond to a maximum data transfer rate permitted in accordance with the moving speed;

a comparing section for reading out the moving speed of said mobile communication terminal apparatus from said moving speed calculation section/storage section, reading out a maximum data transfer rate in an air zone which corresponds to the current moving speed of said mobile communication terminal apparatus from said moving speed/maximum data transfer rate correspondence table, comparing the maximum data transfer rate correspondence table, comparing the maximum data transfer rate with the desired data transfer rate input from said data transfer rate input section, and outputting a lower data transfer rate;

an origination request section for requesting an outgoing call upon multiplexing the data transfer rate output from said comparing section on a data transfer rate designation field of a signal format as an origination request message; and a transmission/section section for transmitting the origination request message from said origination request section through an antenna;

wherein communication with said base station is performed at a data transfer rate permitted in accordance with the moving speed of said mobile communication terminal apparatus.

* * * * *